3,476,701
ADHESIVE COMPOSITIONS COMPRISING THE REACTION PRODUCT OF A SUBSTITUTED PHENOL AND A TRIOXOHEXAHYDRO-s-TRIAZINE
Derek Harry Aldred and Robert Alexander Edington, Harrogate, England, assignors to Imperial Chemical Industries Limited, London, England, a corporation of Great Britain
No Drawing. Filed Nov. 8, 1965, Ser. No. 506,864
Int. Cl. C08g 33/02; C09j 3/16
U.S. Cl. 260—29.3
3 Claims

ABSTRACT OF THE DISCLOSURE

There is provided an adhesive composition for bonding synthetic fibrous material to natural or synthetic rubber in which the adhesive composition comprises the products of interaction of a 1:3:5-trisubstituted-2:4:6-trioxohexahydro-s-triazine with a substituted phenol. There is also provided a process for treating synthetic fibrous materials wherein the fibrous materials are dipped into an aqueous composition of the above-described adhesive composition.

---

This invention relates to adhesive compositions for bonding fibrous material to natural or synthetic rubber.

According to the present invention such compositions are based on the products of interaction of a 1:3:5-trisubstituted 2:4:6-trioxohexahydro-s-triazine with a substituted phenol.

Suitable 1:3:5-trisubstituted 2:4:6-trioxohexahydro-s-triazines include:
(I)

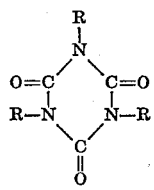

where $R=CH_2=CHCH_2-$, 1:3:5-triallyl-2:4:6-trioxohexahydro-s-triazine; or where

1:3:5 - tri - (Δ - 9 - octadecenyl) - 2:4:6 - trioxohexahydro-s-triazine; or where $R=n-C_3H_7-$, 1:3:5-tri-n-propyl-2:4:6-trioxohexahydro-s-triazine.

Suitable substituted phenols include: dihydroxybenzenes (catechol, resorcinol, hydroquinone); trihydroxybenzenes; dihydroxynaphthalenes; trihydroxynaphthalenes; monoalkoxy-monohydroxy benzenes; monoalkoxy-monohydroxy naphthalenes; dialkoxy-monohydroxy benzenes; and dialkoxy-monohydroxy naphthalenes.

In general substituent groups are preferred which are hydrophilic or which tend to increase the reactiivty of the aromatic nucleus or both.

Whilst the product of interaction of substituted triazine and substituted phenol may be sufficiently soluble to be incorporated into an aqueous adhesive composition, it may be advantageous in certain cases to increase further the water solubility of the product by treatment of the product with an aliphatic aldehyde.

It may be desirable to adjust the pH of an aqueous solution of the product of interaction of substituted triazine and substituted phenol or of the product of subsequent treatment of this product with an aliphatic aldehyde before incorporation into the final adhesive composition. Organic or inorganic acids or bases may be used.

For use in bonding textile fibres to rubber the products of the present invention may be used in several ways:

(a) The product of interaction of substituted triazine and substituted phenol or the product of subsequent treatment with an aliphatic aldehyde of the product of interaction of substituted triazine and substituted phenol may be applied to the textile as a solution, in water or any other solvent, prior to suitable heat treatment and building into a shaped structure with a suitable composition of natural or synthetic rubber.

(b) Textile structures treated as in (a) may be treated after the suitable heat treatment with a second composition before further suitable heat treatment and incorporation into a shaped structure: this second composition may conveniently contain natural or synthetic rubber latices or water soluble resins of the phenol-aldehyde type or both.

(c) Textile fibres may be treated with a single adhesive composition containing: (i) The product of interaction of substituted triazine and substituted phenol or the product of subsequent treatment with an aliphatic aldehyde of the product of interaction of substituted triazine and substituted phenol; (ii) natural or synthetic rubber latices; and (iii) water soluble resins of the phenol-aldehyde type, followed by suitable heat treatment.

The subjects of the present invention are particularly suitable for application by the methods (a) and (c), which are in general the preferred methods of application for reasons of operating economy.

The term "suitable heat treatment" should be taken to include temperatures up to the melting point of the fibres used. In practice, this heat treatment is usually carried out on a machine which controls the applied stretch and/or tension in the heating region.

EXAMPLE 1

A mixture of 1:3:5-triallyl-2:4:6-trioxohexahydro-s-triazine (16 parts) and resorcinol (67 parts) was stirred at 130° C., and a 37% aqueous solution of formaldehyde (18.6 parts) was added slowly over a period of 2 hours. The clear viscous resin so obtained was cooled to 100° and an aqueous solution of ammonia (made by adding 18.6 parts of concentrated ammonia (specific gravity 0.88) to 267 parts of water) was added over a period of five minutes. The clear aqueous solution so obtained was added to an equal volume of a mixture containing

|  | Parts |
|---|---|
| Resorcinol | 50 |
| Formaldehyde (37%) | 28 |
| Water | 337 |
| "GenTac" (registered trademark) | 585 | to give the final one stage adhesive composition.

A tyre cord of polyethylene terephthalate of a 2-ply 1000-denier construction twisted together with 11 turns per inch in both the singles twisting and plying operations was dipped in the one stage adhesive composition described above, on a cord treating machine. The tension in the dipping stage was 500 grams and in the heating zone 600 grams. The heating zone consisted of an oven in which the cord was subjected to a high velocity transverse air stream, the air temperature being 230° C., during a period of 50 seconds.

The treated cords so obtained were moulded for 20 minutes at 150° C. into rubber of the following composition:

| | Parts |
|---|---|
| Smoked sheet | 100 |
| Stearic acid | 2 |
| Zinc acid | 5 |
| FEF carbon black | 40 |
| Pine Tar | 1.5 |
| Coumarone resin | 1.5 |
| "Nonox BL" an antioxidant (regd. trademark) | 2.0 |
| "Vulcafor MBTS" an accelerator (regd. trademark) | 0.85 |
| Insoluble sulphur | 2.6 | in a suitable mould which produced U-shaped loops of cord embedded in ¼″ depth of rubber. These cord-rubber assemblies were heated to 120° C. in a special attachment for a tensile tester and the force necessary to pull one end of the U out of the rubber was measured at a rate of separation of 30 cm./min. which corresponds to a rate of loading of 3.0 lbs./sec.

For the above cord the pull out force was 13.5 lbs.

EXAMPLE 2

A mixture of 1:3:5-triallyl-2:4:6-trioxohexahydro-s-triazine (16 parts) and resorcinol (67 parts) was stirred at 130° C. for 2 hours. Water (20 parts) was added at this temperature and when the temperature fell to 100° C. aqueous ammonia (285.6 parts) added as in Example 1. The rest of the procedure described in example 1 was then followed, giving a pull out force of 13.0 lbs.

EXAMPLE 3

Example 1 was repeated except that the amount of resorcinol was reduced in 22 parts. The pull out force was 15.0 lbs.

EXAMPLE 4

1:3:5 - triallyl - 2:4:6 - trioxohexahydro - s - triazine (16 parts) resorcinol (67 parts) and concentrated sulphuric acid (0.2 part) were thoroughly mixed and left at room temperature for 16 hours. 37% aqueous formaldehyde (18.6 parts) was then added and the mixture stirred at room temperature for 2 hours. To the resulting clear viscous liquid was then added 285.6 parts of an ammonia solution (as in Example 1). The procedure thereafter was as in Example 1 and the pull out force was 16.0 lbs.

EXAMPLE 5

Example 1 was repeated except that 3-methoxy phenol (24.8 parts) was used instead of resorcinol. The pull out force was 18.0 lbs.

EXAMPLE 6

Example 1 was repeated, except that 1:3:5-tripropyl-2:4:6 - trioxohexahydro - s - triazine (15.7 parts) was used instead of 1:3:5-triallyl-2:4:6-trioxohexahydro-s-triazine. The pull out force was 17.0 lbs.

The nomenclature of our triazine compounds, which does not follow the one given in Chem. Abs. is taken from "Heterocyclic Compounds; s-triazines and Derivatives" by E. Smolin and L. Rapaport, Interscience Publishers Ltd., 1959.

What we claim is:

1. An adhesive composition for bonding synthetic fibrous material to natural or synthetic rubber in which the adhesive composition comprises the products of interaction of a 1:3:5-trisubstituted 2:4:6-trioxohexahydro-s-triazine selected from the compounds

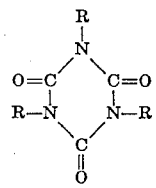

where R=CH$_2$=CHCH$_2$—, 1:3:5 - triallyl - 2:4:6 - trioxohexahydro-s-triazine, or where

1:3:5 - tri - (Δ - 9 - octadecenyl) - 2:4:6 - trioxohexahydro-s-triazine; or where R=n—C$_3$H$_7$—, 1:3:5-tri-n-propyl-2:4:6-trioxohexahydro-s-triazine;

with a substituted phenol selected from dihydroxy benzenes, trihydroxybenzenes, dihydroxynaphthalenes, monoalkoxy - monohydroxy benzenes, monoalkoxy - monohydroxy naphthalenes and dialkoxy-monohydroxy naphthalenes.

2. An adhesive composition according to claim 1 in which the substituted phenol is selected from at least one of the following: catechol, resorcinol, hydroquinone.

3. An adhesive composition according to claim 1 wherein the said composition is an aqueous adhesive composition and the water solubility of the aqueous composition is increased by treatment with an aliphatic aldehyde.

References Cited

UNITED STATES PATENTS

| 2,809,942 | 10/1957 | Cooke | 260—2 |
| 2,969,360 | 1/1961 | Westfall | 260—248 |
| 2,977,371 | 3/1961 | Dixon | 260—307 |
| 3,318,750 | 5/1967 | Aitken | 156—331 |
| 3,337,509 | 8/1967 | Budnowski | 260—77.5 |

HAROLD D. ANDERSON, Primary Examiner

H. SCHAIN, Assistant Examiner

U.S. Cl. X.R.

57—140; 117—76, 80, 138.8, 161; 156—331, 335; 161—227, 241; 260—3, 29.2, 47, 51.5, 52, 54, 839